United States Patent [19]

Furuya et al.

[11] Patent Number: 5,124,018
[45] Date of Patent: Jun. 23, 1992

[54] PROCESS FOR PREPARING RAW MATERIALS FOR REACTION LAYER OF GAS PERMEABLE ELECTRODE

[75] Inventors: Nagakazu Furuya, No. 4-3-31, Ohte 2-Chome; Satoshi Motoo, No. 5-24, Takeda 3-chome, both of Kofu-shi, Yamanashi, Japan

[73] Assignees: Nagakazu Furuya; Satoshi Motoo; Tanaka Kikinzoku Kogyo K.K., Japan

[21] Appl. No.: 283,782

[22] Filed: Dec. 13, 1988

Related U.S. Application Data

[62] Division of Ser. No. 34,499, Apr. 3, 1987, Pat. No. 4,816,431.

[30] Foreign Application Priority Data

Apr. 3, 1986 [JP] Japan .................. 61-76889
Sep. 3, 1986 [JP] Japan .................. 61-207600
Mar. 12, 1987 [JP] Japan .................. 62-57378

[51] Int. Cl.$^5$ .................................... C25B 11/12
[52] U.S. Cl. ...................... 204/284; 204/290 R; 204/291; 429/42
[58] Field of Search ............... 204/284, 291, 292, 294, 204/290 R, 283; 429/421

[56] References Cited

U.S. PATENT DOCUMENTS 4,389,297  6/1983  Korach .................. 204/252
4,581,116  4/1986  Plowman et al. .......... 204/284

Primary Examiner—John Niebling
Assistant Examiner—Kathryn Gorgos

[57] ABSTRACT

Disclosed herein are processes for preparing a raw material dispersion and raw material powders for producing reaction layers of a gas permeable electrode. The raw materials are prepared in one aspect of the invention by mixing fine particles containing a surface-active agent, freezing the mixture to a temperature the surface-active agent loses at least part of its function and then thawing out the same. The resulting material exhibits superior catalytic performance because the particles are dispersed uniformly by lack of the function of surfaceactive agent at the time of freezing.

The raw materials are prepared in another aspect of the invention by mixing hydrophilic minute particles coated with ion exchange resin, PTFE and hydrophobic fine powders. The resulting material exhibits superior catalytic performance because catalysts contained in the hydrophilic minute particles are neither liberated nor made to flow so that the initial catalytic activities are substantially maintained even after a relatively long period of use.

4 Claims, No Drawings

5,124,018

PROCESS FOR PREPARING RAW MATERIALS FOR REACTION LAYER OF GAS PERMEABLE ELECTRODE

This is a division of application Ser. No. 034,499, filed Apr. 3, 1987 now U.S. Pat. No. 4,816,431.

BACKGROUND OF THE INVENTION

The present invention relates to a process for preparing raw material powders or a raw material dispersion which is employed in the manufacture of reaction layers of a gas permeable electrode for use in a fuel cell, a secondary battery, an electrochemical reactor and the like.

A gas permeable electrode generally comprises a hydrophilic reaction layer and a hydrophobic gas permeable layer attached to each other, and a collecting member attached to the opposite surface of the gas permeable layer.

The hydrophilic reaction layer of the gas permeable electrode may comprise hydrophilic carbon blacks, polytetrafluoroethylene (hereinafter referred to as PTFE) and hydrophobic carbon blacks, and contains supported catalysts if necessary. In order to conventionally prepare a raw material dispersion for the reaction layer, the mixture of hydrophobic (or hydrophilic) carbon blacks, PTFE, water and a surface-active agent is filtered to form a cake, which is then thermally dried and pulverised.

In such a process for preparing the raw material powders, uniform and fine particles can not be obtained because the dried cake is mechanically pulverised. Even if the thus obtained powders are mixed with hydrophilic (or hydrophobic) carbon blacks or hydrophilic carbon blacks supporting catalysts and PTFE to form the reaction layer by means of calcination, hydrophilic portions and hydrophobic portions may not be uniformly and finely dispersed, to lower the catalytic performance because the raw material powders are non-uniform and bulky.

Further, in the gas permeable electrode which has been prepared from the above mixed powders containing the catalysts, the catalysts supported on the hydrophilic carbon blacks may be liberated to aggregate, or the catalysts among the PTFE fine powders and the hydrophobic carbon blacks may flow to aggregate in a relatively short period of use. Consequently, the dispersion density of the catalysts comes to be less uniform and the clusters of the catalysts become more bulky. When an electrolyte penetrates and gas disperses and permeates, they are in contact with only the surface of the aggregated catalysts and not in contact with the internal catalysts so that less catalysts can act effectively. Accordingly, the quantity of current flow per unit area is so low that the effectiveness is quite unsatisfactory.

The degradation of the catalysts due to the liberation and the flowing is rapid, and the life of the gas permeable electrode may be shorter.

SUMMARY OF THE INVENTION

The present invention has been devised to overcome such disadvantages. It is an object of the present invention to provide a process for readily producing a large volume of a dispersion of uniformly and finely dispersed raw materials for a gas permeable electrode.

It is another object of the invention to provide a process for preparing raw material powders for producing a gas permeable electrode free from catalysts' liberation from hydrophilic carbon blacks or catalysts' flowing from the portions among PTFE fine powders and hydrophobic carbon blacks.

The process of the invention for preparing a dispersion of raw materials for reaction layers of a gas permeable electrode comprises mixing hydrophobic (or hydrophilic) carbon blacks, PTFE, water and surface-active agent, freezing this mixture to the temperature at which the surface-active agent loses at least part of its function and then thawing out the mixture.

On the other hand, the process for preparing raw material powders for reaction layers of a gas permeable electrode comprises mixing fine particles comprising hydrophilic minute particles coated with an ion exchange resin, PTFE fine powders and the hydrophobic fine powders.

DETAILED DESCRIPTION OF THE INVENTION

The initial mixture of the invention for preparing the raw material dispersion may comprise hydrophilic carbon blacks or hydrophobic carbon blacks, PTFE powders, water and a surface-active agent, and should not contain both of the carbon blacks.

The surface-active agent employed in the invention is optionally selected from the conventional non-ionic surface-active agents.

The freezing speed and the freezing temperature of the mixture may depend on the desired qualities of the resulting product and the surface-active agent employed. Especially, the particle size of the dispersion can be readily controlled by varying the freezing speed. The particle size may come to be larger with the increase of the freezing speed and vice versa. The freezing temperature should be one at which the surface-active agent loses all or almost all of its function. The lower temperatures may be employed. The freezing temperature is preferably −5° to about 50° C. The thawing speed of the frozen mixture may scarcely influence the qualities of the resulting product.

The thus prepared raw material dispersion may then be mixed with either of the hydrophilic carbon blacks or the hydrophobic carbon blacks which have not been included in the initial mixture, and any other additives to prepare the reaction layers of a gas permeable electrode. The electrode possesses hydrophilic portions and hydrophobic portions uniformly and finely distributed so that a larger contact area between an electrolyte and gas may be provided to effectively carry out the reaction to promote the catalytic performance.

The hydrophilic carbon blacks containing the catalysts employed in the invention may be coated with an ion exchange resin for preventing the catalysts' liberation and flowing.

In this aspect of the present invention, since the process of the invention for preparing the dispersion of the raw materials for the reaction layers of the gas permeable electrode is, as described earlier, to freeze the mixture of the raw material powders and then to thaw out the same, the surface-active agent becomes non-functioning at the time of freezing so that a number of uniform aggregation clusters of the PTFE fine powders can be formed and frozen incorporating the hydrophobic (or hydrophilic) carbon blacks. The aggregation clusters are then thawed out, as they are by thawing, to provide a uniform and finely dispersed raw material dispersion.

On the other hand, hydrophilic minute particles for preparing raw material powders may be either hydrophilic carbon blacks supporting catalysts or catalyst powders themselves. The ion exchange resin may be any resin provided that it serves to protect the hydrophilic minute particles from the catalysts' liberaton or flowing and to allow electrolyte and gas permeation.

The coating method of the ion exchange resin may be arbitrarily selected from conventional coating techniques, one example of which is that a liquid ion exchange resin diluted with an alcohol may be mixed with hydrophilic carbon blacks and then the solvent is evaporated to form the hydrophilic carbon blacks coated with the ion exchange resin.

The catalysts employed in the invention are preferably selected from the group consisting of precious metals including platinum and their alloys, and base metals and their alloys.

The raw material powders thus obtained may be then press-molded to form a reaction layer, which is further attached to a gas permeable layer separately prepared to obtain a gas permeable electrode.

In this aspect of the present invention, since the catalysts supported on the hydrophilic carbon blacks in the gas permeable electrode prepared from the above raw material powders are coated with the ion exchange resin, the catalysts are not liberated from the hydrophilic carbon blacks even after a long period of use. Further, the catalysts coated with the ion exchange resin do not flow among the PTFE fine powders and the hydrophobic carbon blacks. Accordingly, the catalysts of which a dispersion rate is high do not aggregate and remain uniform and finely divided. When an electrolyte penetrates and gas permeates, cations may permeate the ion exchange resin to be in contact with almost all the catalysts to carry out an effective reaction. In such a way, the amount of current flow per unit weight of the catalysts can be enlarged, and the effectiveness can be remarkably elevated. Further, since the liberation and the flowing of the catalysts are prevented, the life of the gas permeable electrode can be considerably extended.

Several preferred examples of the invention together with a conventional example will be described. However, the present invention is not intended to be limited to these examples.

EXAMPLE 1

Hydrophobic carbon blacks having a mean particle size of 420 A, PTFE powders having a mean particle size of 0.3 u, water and Triton (trademark) X-100 as a surface-active agent were mixed in the proportion of 7:3:1000:100. The mixture was then chilled from the ambient temperature to $-30°$ C. at the rate of $20°$ C./hour, and thereafter the frozen mixture was thawed out to the ambient temperature to provide a raw material dispersion for reaction layers of a gas permeable electrode having a particle size of 2 10 u.

On the other hand, hydrophobic carbon blacks having a mean particle size of 420 A, PTFE powders having a mean particle size of 0.3 u, water and Triton X-100 were mixed in the proportion of 7:3:1000:100. The mixture was then filtered in a filtering vessel to prepare a cake. The cake was then thermally dried at $280°$ C. for 3 hours, and thereafter pulverised to provide raw material powders for reaction layers of a conventional gas permeable electrode having a particle size of 1 to about 100.

As mentioned, while the particle size of the raw material powders of the latter conventional example was 1 to about 100 which was larger and non-uniform and the scattering thereof was high, the particle size of the former present example was 2 to about 10 which was smaller and nearly uniform, and the scattering thereof was low.

Thereafter, water and a surface-active agent was added to the raw material dispersion according to the present Example and to the raw material powders according to the conventional example to provide two respective dispersions. The respective dispersions and hydrophilic carbon blacks having a mean particle size of 390 A and PTFE dispersion having a mean particle size of 0.3 u were mixed in the proportion of 3:7 in an aqueous solution, which were dried at $280°$ C. for 3 hours after filtration, and then sintered at $380°$ C. for 3 seconds to provide respective reaction layers having a thickness of 0.1 mm. Upon the use of the respective reaction layers in a gas permeable electrode, the catalytic performance of the electrode employing the conventional raw material powders was low because the hydrophilic portions and the hydrophobic portions were not distributed uniformly and were not divided finely, to provide an insufficient contact area between electrolyte and gas. On the other hand, the catalytic performance of the electrode employing the raw material dispersion of the present Example was high because the hydrophilic portions and the hydrophobic portions were distributed uniformly and were finely divided, thereby to provide a sufficient contact area between electrolyte and gas to sufficiently carry out a reaction.

EXAMPLE 2

The same procedure as in the Example 1 was carried out except that the hydrophobic carbon blacks having a mean particle size of 420 A and the hydrophobic carbon blacks having a mean particle size of 390 A were replaced by the hydrophobic carbon blacks and the hydrophilic carbon blacks both of which have a mean particle size of 420 A, respectively. While the particle size of the resulting raw material dispersion after the freezing and the thawing was 2 to about 10, the particle size of that without the freezing and the thawing was 1 to about 100.

The catalytic performance of the gas permeable electrode of the present Example was high for the same reasons as mentioned in Example 1.

EXAMPLE 3

Fine powders having been prepared by coating a 0.05 u of Nafion (tradename of ion exchange resin) onto hydrophilic carbon blacks having a mean particle size of 420 A supporting platinum powders having a mean particle size of 30 A; PTFE fine powders having a mean particle size of 0.3 u; and hydrophobic carbon black fine powders having a mean particle size of 420 A were mixed in the proportion of 3:4:3 to provide raw material powders of the present Example.

The raw material powders consisting of the mixed fine powders were disposed on a base plate at a thickness of 0.45 mm and pressed to provide a gas permeable electrode containing a reaction layer having a thickness of 0.1 mm.

The thus obtained gas permeable electrode was used as an air electrode in a fuel cell of which an electrolyte is 20% sulfuric acid. After the lapse of 1000 hours, the platinum fine powders supported on the hydrophilic carbon blacks were not liberated. As a result of an active reaction which occurred by contacting the cations of the penetrated electrolyte with most of the platinum fine powders through the ion exchange resin, the quantity of current passed per unit weight of the platinum powders was about 1.5 times as large as that of a conventional electrode, which led to the remarkably elevated efficiency.

The life of the gas permeable electrode was about twice as long as that of the conventional one because the deterioration due to the liberation and the flowing of the platinum fine powders was prevented.

EXAMPLE 4

Fine powders having been prepared by coating a 0.01 u of Nafion (tradename of ion exchange resin) onto platinum having a mean particle size of 30 A; PTFE fine powders having a mean particle size of 0.3 u; and hydrophobic carbon black fine powders having a mean particle size of 420 A were mixed in the proportion of 4:4:3 to provide raw material powders of the present Example.

The mixture was treated and used as an air electrode by the same procedure as Example 3. After the lapse of 1000 hours, the aggregation of the platinum fine powders which remained in the uniform and finely divided condition was prevented by the ion exchange resin so that the quantity of current passed per unit weight of the platinum powders was about 1.5 times as large as that of a conventional electrode, and the life of the gas permeable electrode was about twice as long as that of the conventional one.

What is claimed is:

1. A process for preparing raw material powders for a reaction layer of a gas-permeable electrode comprising mixing hydrophilic minute particles coated with ion exchange resin, polytetrafluoroethylene powder and hydrophobic carbon black powder.

2. The process as claimed in claim 1, wherein the hydrophilic minute particles comprise hydrophilic carbon blacks supporting catalysts.

3. The process as claimed in claim 1, wherein the hydrophilic minute particles comprise catalysts themselves.

4. A process for preparing raw material powders for a reaction layer of a gas permeable electrode which comprises mixing hydrophilic carbon black particles supporting catalysts and coated with an ion exchange resin, with polytetrafluoroethylene powder and hydrophobic carbon black powder, each of said ingredients having a mean particle size less than a micron.

* * * * *